(12) United States Patent
Silverberg et al.

(10) Patent No.: US 7,562,378 B2
(45) Date of Patent: Jul. 14, 2009

(54) METHODS AND SYSTEMS FOR CONSTRUCTING AND EDITING ELECTRONIC PROGRAM GUIDE LINEUPS

(75) Inventors: Eric J. Silverberg, Seattle, WA (US);
Alan E. Shield, Issaquah, WA (US);
Christopher F. Pezzee, Redmond, WA (US); Glenn A. Curtis, Sammamish, WA (US); Mark D. Schwesinger, Seattle, WA (US); Shawn E. Pickett, Sammamish, WA (US); Thaddeus C. Pritchett, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 10/900,947

(22) Filed: Jul. 28, 2004

(65) Prior Publication Data

US 2006/0026643 A1    Feb. 2, 2006

(51) Int. Cl.
*H04N 5/445* (2006.01)
*G06F 3/00* (2006.01)
*G06F 13/00* (2006.01)

(52) U.S. Cl. ...................................................... 725/48
(58) Field of Classification Search .................... 725/40
See application file for complete search history.

(56) References Cited

U.S. PATENT DOCUMENTS

| | | | |
|---|---|---|---|
| 5,630,119 A | | 5/1997 | Aristides et al. |
| 5,635,978 A | * | 6/1997 | Alten et al. .................... 725/42 |
| 5,657,072 A | | 8/1997 | Aristides et al. |
| 5,684,525 A | | 11/1997 | Klosterman |
| 5,751,282 A | | 5/1998 | Girard et al. |
| 5,802,502 A | | 9/1998 | Gell et al. |
| 5,805,763 A | | 9/1998 | Lawler et al. |
| 5,808,702 A | | 9/1998 | Yoshinobu et al. |
| 5,914,746 A | | 6/1999 | Matthews, III et al. |
| 5,923,362 A | * | 7/1999 | Klosterman ................... 725/48 |
| 5,986,650 A | * | 11/1999 | Ellis et al. ...................... 725/40 |
| 6,049,823 A | | 4/2000 | Hwang |
| 6,133,910 A | | 10/2000 | Stinebruner |

(Continued)

FOREIGN PATENT DOCUMENTS

EP    0849954    6/1998

(Continued)

OTHER PUBLICATIONS

Chinese Office Action dated Nov. 14, 2008, 22 pages.

*Primary Examiner*—Andrew Y Koenig
*Assistant Examiner*—Mark D Featherstone
(74) *Attorney, Agent, or Firm*—Lee & Hayes, PLLC

(57) ABSTRACT

Various embodiments provide accurate EPG lineup construction and PVR scheduling for users, regardless of their geographic location. In accordance with the described embodiments, the guide retrieves and aggregates data from multiple available sources, particularly in-band scanning and EPG metadata download. Services are then identified and sorted into logically equivalent groups. Once the services are grouped, in accordance with one embodiment, an analysis is conducted the outcome of which is directed to selecting which services to use for tuning and which services to use for scheduling on a given channel/preset. In addition, various embodiments can, in an automated fashion, assign services to presets/channels, as well as provide a user interface and methods for editing a lineup, modifying tuning information and personalizing presets/channels.

37 Claims, 4 Drawing Sheets

U.S. PATENT DOCUMENTS

| | | |
|---|---|---|
| 6,598,079 B1 | 7/2003 | Pal et al. |
| 6,631,523 B1 | 10/2003 | Matthews, III et al. |
| 6,698,020 B1 | 2/2004 | Zigmond et al. |
| 6,704,929 B1 | 3/2004 | Ozer et al. |
| 6,725,215 B2 * | 4/2004 | Yamamoto .................... 707/3 |
| 6,832,070 B1 * | 12/2004 | Perry et al. ................ 455/3.02 |
| 6,968,364 B1 * | 11/2005 | Wong et al. ................. 709/217 |
| 7,140,032 B2 * | 11/2006 | Dew et al. .................... 725/46 |
| 2002/0186296 A1 | 12/2002 | Gogoi et al. |
| 2003/0110490 A1 | 6/2003 | Dew et al. |
| 2004/0078807 A1 | 4/2004 | Fries et al. |

FOREIGN PATENT DOCUMENTS

| | | |
|---|---|---|
| EP | 1158790 | 11/2001 |
| EP | 1383325 | 1/2004 |
| WO | WO0040017 | 7/2000 |

* cited by examiner

US 7,562,378 B2

METHODS AND SYSTEMS FOR CONSTRUCTING AND EDITING ELECTRONIC PROGRAM GUIDE LINEUPS

TECHNICAL FIELD

This invention relates to methods and systems for constructing lineups, such as those that are employed in the context of entertainment systems that allow a user to view and record programs, such as television programs and the like.

BACKGROUND

A lineup can be considered as a list of services that are broadcast and an amount of tuning information that allows one to tune to that service. A service 9 refers to a producer of broadcast content that is distributed by a service provider. Examples of services include HBO, CNN and BBC One, to name just a few. Services can also include audio-only or data services. Along with services, scheduling information—which refers to program names, presentation times and other data associated with individual programs—can be associated to provide an electronic program guide (EPG) or simply a "guide", which is typically visually presented to a user in the form of a grid with rows and columns. When used as a noun, a "guide" refers to the platform object that stores information about programs and their scheduled broadcasts. A platform object is an abstraction for a piece of code that can be used by multiple processes or applications. As an adjective, "guide" is used to describe data from which a guide is created. Using an EPG and its associated visual presentation (i.e. a grid) or user interface (UI), a user or viewer can ascertain when desired programs are to be broadcast and can make appropriate program selections and viewing decisions such as viewing a particular program in the present, selecting a particular program for recording in the future on, for example, a personal video recorder (PVR), digital video recorder (DVR), and the like.

When guide accuracy breaks down, however, so too does the user's experience. As an example, consider the following.

In some markets, a complete set of guide information or data may not be available. For example, necessary or accurate tuning information (i.e. that information that allows one to receive and process an appropriate signal) may not be available for individual services in a broadcast area. Specifically, in some countries of the world, tuning information received from data providers is not as precise as it is in the United States. For example, as one travels from region to region, one may find the same service being broadcast on a different frequency. Yet, the data provider that provides the tuning information may not know of, or otherwise be able to provide accurate tuning information for services in these different regions. Hence, inaccurate information can ultimately end up being presented to a user which, in turn, degrades not only their experience, but adversely affects the ability of the data provider to provide satisfactory service to their customers.

Another problem that can exist stems from the use of non-standard transmission frequencies as between, for example, cable providers or headends. Specifically, in some markets, it has been observed that as one moves from headend to headend, transmission frequencies are not standardized and, in fact, vary. A headend, in the cable industry, refers to equipment at a physical location that services a geographic area by broadcasting a signal for a single lineup. A digital headend, however, may support multiple lineups.

Additionally, consider the notion of a tuning space. A tuning space refers to a particular broadcast medium and the ways to tune to it. Each tuning space may require a different way of tuning that a guide data provider may or may not support. In the case where the guide data provider does not have the appropriate tuning space information, the user would be unable to tune to programs broadcast on the associated medium or schedule advance recordings.

All of these particular situations, as well as others, provide challenges not only to those who desire to provide viewing-related products and services to users, but to those who desire to consume such products and services as well.

SUMMARY

Various embodiments provide accurate EPG lineup construction and PVR scheduling for users, regardless of their geographic location. In accordance with the described embodiments, the guide retrieves and aggregates data from multiple available sources, particularly in-band scanning and EPG metadata download. Services are then identified and sorted into logically equivalent groups. Once the services are grouped, in accordance with one embodiment, an analysis is conducted the outcome of which is directed to selecting which services to use for tuning and which services to use for scheduling on a given channel/preset. In addition, various embodiments can, in an automated fashion, assign services to presets/channels, as well as provide a user interface and methods for editing a lineup, modifying tuning information and personalizing presets/channels.

DETAILED DESCRIPTION

Overview

Various embodiments provide accurate EPG lineup construction and PVR scheduling for users, regardless of their geographic location. In accordance with the described embodiments, the guide retrieves and aggregates data from multiple available data sources, particularly in-band scanning and EPG metadata download. Metadata can be considered as data about data. In the context of this document, metadata can be considered to include, without limitation, tuning information that can be used to tune to a particular broadcast, and scheduling information that describes program titles, scheduled program broadcast times, and information about specific programs such as actors, plots and the like.

Once identified, services are then sorted into logically equivalent groups. Once the services are grouped, in accordance with one embodiment, an analysis is conducted the outcome of which is directed to selecting which services to use for tuning and which services to use for scheduling on a given channel/preset. In the context of this document, the terms channel and preset are used interchangeably. The terms "channel" and "preset" are used to refer to a number associated with a service that users enter, typically with a remote control, to tune or jump to the service in a guide. Additionally, the channel/preset is typically the number that is displayed next to the row in the grid on which the service is found. In addition, various embodiments can, in an automated fashion, assign services to presets/channels, as well as provide a user interface and methods for editing a lineup, modifying tuning information and personalizing presets/channels.

Exemplary System

Figure 1:
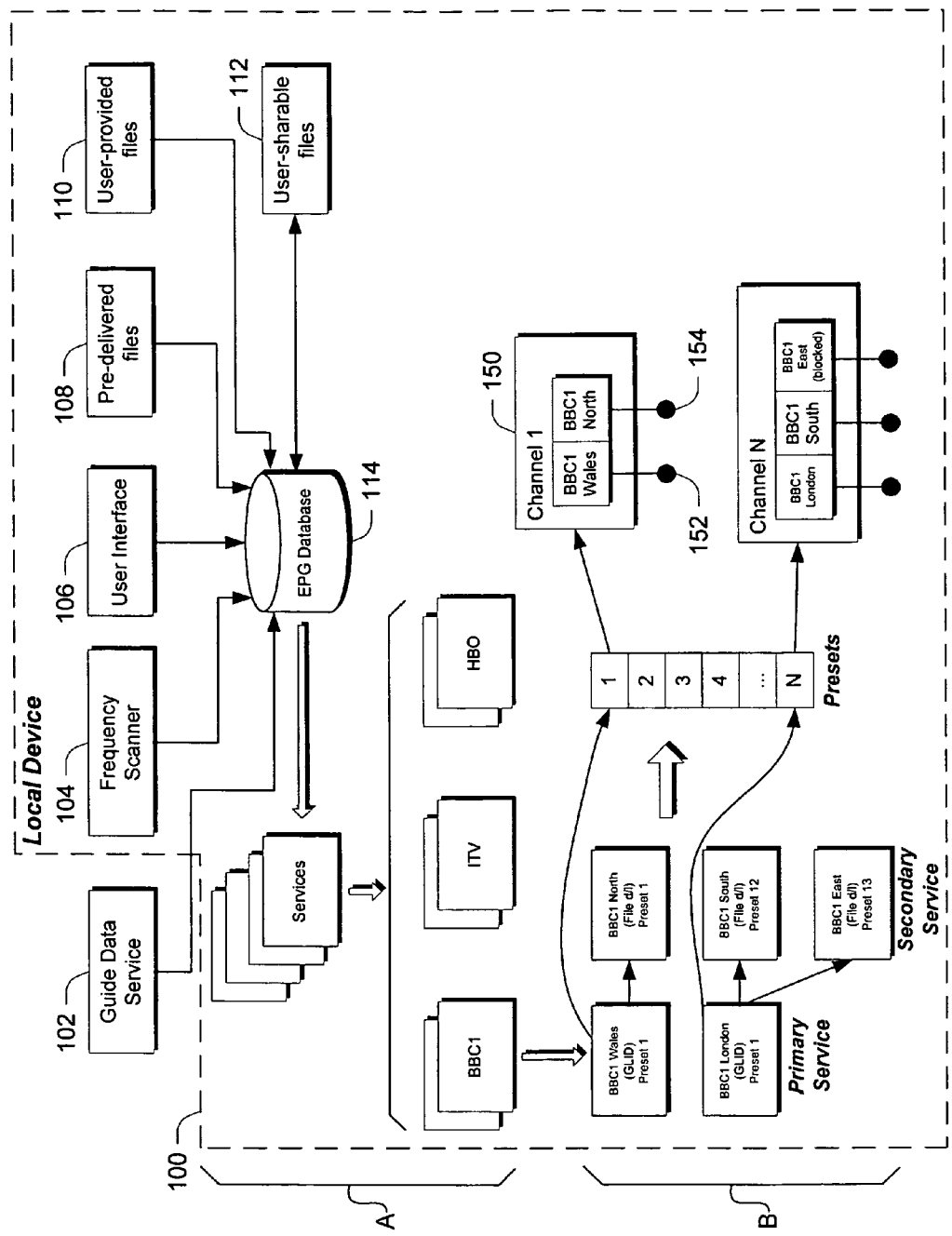
FIG. 1 is a block diagram that illustrates exemplary components, including a local or client device, in accordance with one embodiment.

FIG. 1 illustrates an exemplary system in the form of a local or client device 100 that can be utilized in accordance with the described embodiments. Local device 100 can comprise any suitable type of device that can be used by a user or consumer for watching or otherwise consuming programs, such as television programs and the like. Although an example of one particular type of local device is provided at the end of this document, it is to be appreciated that such devices can vary without departing from the spirit and scope of the claimed subject matter.

Figure 3:
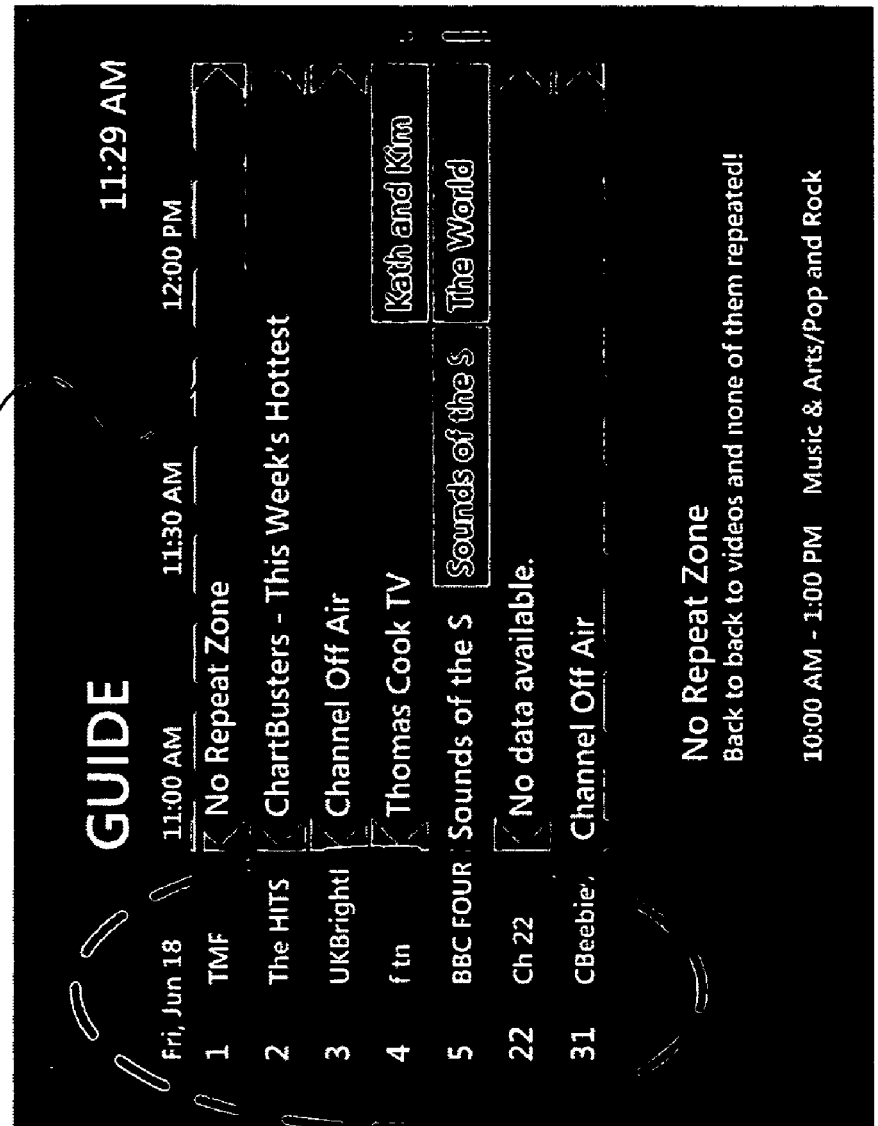
FIG. 3 is a screen shot of an exemplary electronic program guide grid that is presented to a user.

In the illustrated example, multiple different data sources are provided and can provide data associated with services. For the purpose of this document, services can be designated as primary services and secondary services. A primary service is a service that contains tuning information. A primary service may also, but need not have scheduling information associated with it. In the illustrated and described embodiment, each visible row in an EPG grid (an exemplary one of which is shown in FIG. 3 and discussed in more detail below) is associated with one primary service, which will become more apparent below. A secondary service is a service that contains scheduling and program data information. A secondary service does not necessarily contain any or accurate tuning information. In the illustrated and described embodiment, each row in the EPG grid may have zero or more associated secondary services.

In the illustrated and described embodiment, the data sources include, without limitation, a guide data service 102 external from the local device, a frequency scanner 104, a user interface 106, pre-delivered files 108, user-provided files 110, and/or user-sharable files 112. Each of these entities is capable of providing data from which a lineup and subsequently, a displayed grid can be constructed.

The guide data service 102 can be considered as the traditional entity from which guide data or "metadata" is typically received or otherwise downloaded. Frequency scanner 104, which is resident on the local device, scans the signal broadcast and ascertains from in-band data which services are available. For additional information on a suitable frequency scanner that can be utilized in accordance with this embodiment, the reader is referred to U.S. patent application Ser. No. 10/900937, entitled "Broadcast Metadata Plug-In Model", filed on Jul. 28, 2004, and application Ser. No. 10/900925, entitled "Broadcast Metadata Format Independent Of Transmission Standard", filed on Jul. 28, 2004, both of which are assigned to the assignee of this document, the disclosures of which are incorporated by reference herein.

User interface 106 provides a mechanism by which the user can provide source data that is used to edit the lineup, as will become apparent below. Pre-delivered files 108 refers to files that may have come pre-installed on the local device. User-provided files 110 refers to files that the user may have downloaded from an external source, such as the Internet. User-sharable files 112 refers to files that a user is able share with other users. For example, a user of local device 100 may have provided their own particular mappings between presets and services. Using the user-sharable files, this user is then able to upload their files for consumption and use by other users.

Figure 4:
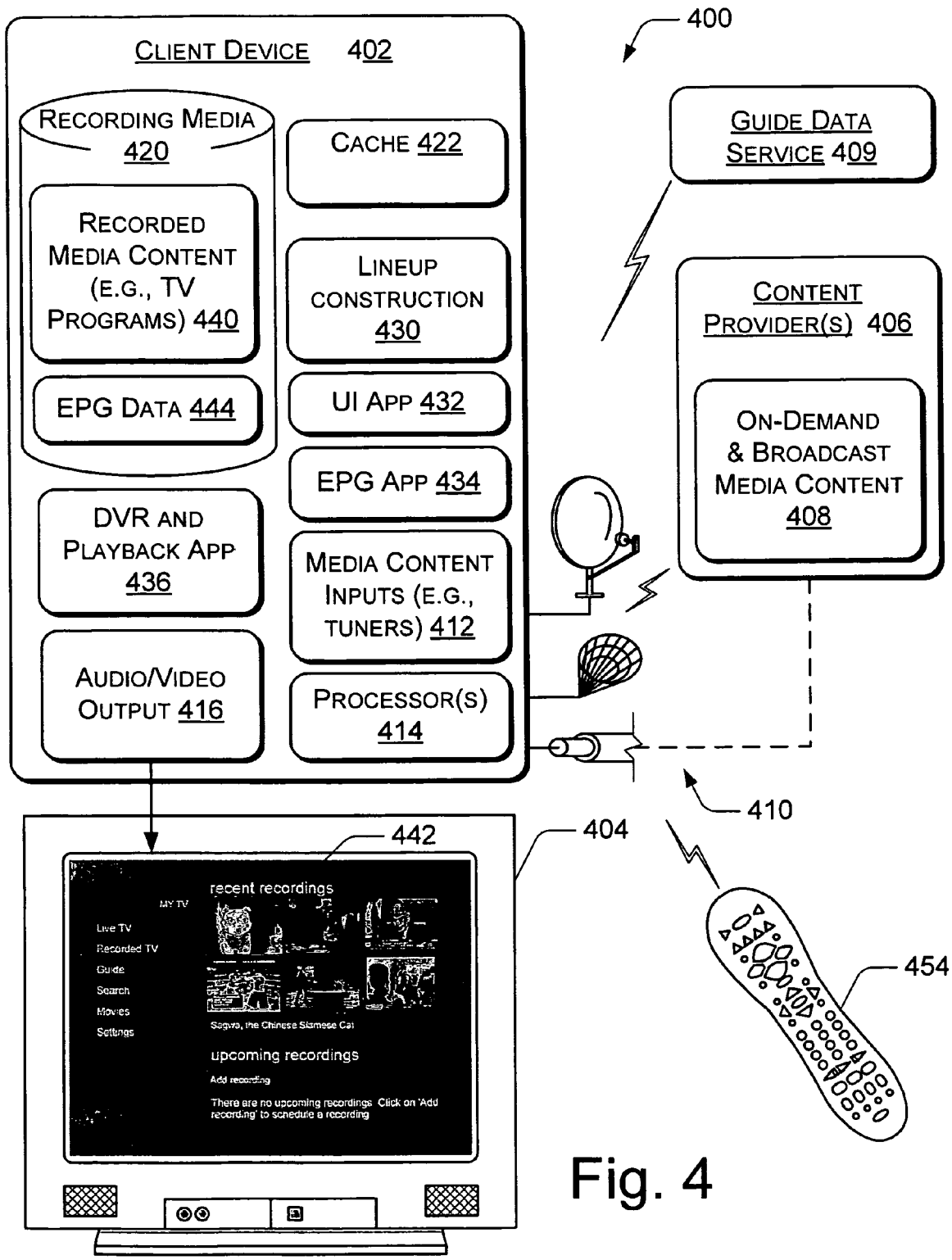
FIG. 4 is a block diagram of an exemplary system in which the various inventive embodiments can be employed.

The data that is provided by each or any of these sources is ultimately processed and stored in an EPG database 114. Consider now the situation in which a lineup is constructed using only the data received from the guide data service 102 and the frequency scanner 104. In the discussion that follows, reference is made to both FIG. 1 and to the flow diagram of FIG. 2, which illustrates a method in accordance with one embodiment. This method can be implemented in connection with any suitable hardware, software, firmware or combination thereof. In the illustrated embodiment, the method is implemented in software that resides on the local device. As noted above, one example of a local device that can implement the method about to be described is illustrated in FIG. 4 and described in detail below.

Figure 2:
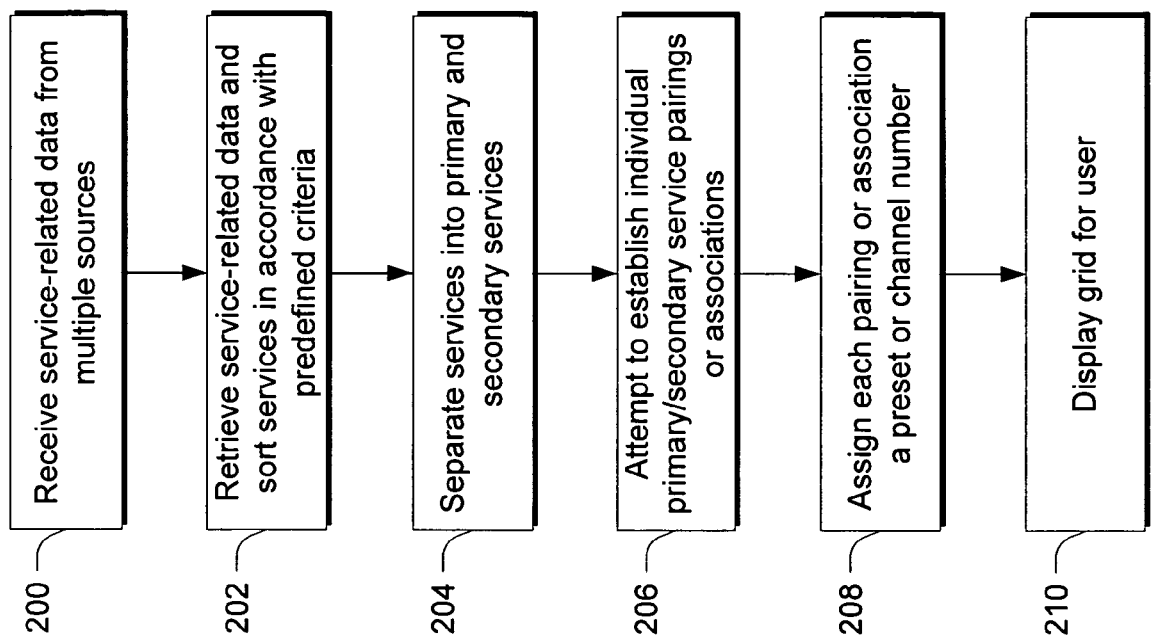
FIG. 2 is a flow diagram that describes steps in a method in accordance with one embodiment.

In FIG. 2, step 200 receives service related data from multiple different sources. This is represented in FIG. 1 by the data flowing into EPG database 114. In the illustrated example of FIG. 1, the multiple sources constitute many different sources. However, for purposes of the present example, assume that only guide data service 102 and frequency scanner 104 are utilized.

Step 202 retrieves the service-related data and sorts the services in accordance with predefined criteria. In at least one embodiment, the sorting of services of step 202 is designed to group logically equivalent services together. Logically equivalent services contain metadata, such as program, scheduling and tuning information, that describes the same broadcast service. Multiple sources will generally provide metadata about the same set of services, and as such this step equates this information from multiple sources that describe the same service.

Any suitable predefined criteria can be used. In one example, the predefined criteria comprise each service's call sign. It is to be appreciated that other predefined criteria can be used such as service name, virtual channel number (e.g., a standard channel on which a service is found in a grid. In the United Kingdom, for example, BBC 1 is found on channel 1 and users press "1" on their remotes to view it, regardless of the frequency on which BBC 1 is broadcast. In the United States, the virtual channel numbers correspond to tuning frequency. Thus, in a given market, a FOX affiliate may be associated with virtual channel number 13, an ABC affiliate may be associated with channel 7, and an ESPN affiliate may be associated with channel 35; in a different market a FOX affiliate may be associated with virtual channel number 2, an ABC affiliate may be associated with channel 3, and an ESPN affiliate may be associated with channel 40. For analog signals in the United States, that associated number is the virtual channel number and the tuning information, which may be used as part of the predefined criteria), globally unique identifier (GUID) and the like. This step is graphically represented in FIG. 1 within the bracket designated "A", where it can be seen that a number of services are first retrieved (in the upper portion of the bracket) and then sorted in accordance with the predefined criteria (in the lower portion of the bracket). In this specific example, three separate services are shown-designated "BBC1", "ITV" and "HBO" respectively, although typically many more services will be processed.

Once the services have been sorted as described above, step 204 separates the services into primary services and secondary services. Recall that primary services are those that contain tuning information, and secondary services are those that contain scheduling and program data information, and not necessarily tuning information. In the FIG. 1 illustration, this step is graphically represented within the bracket designated "B". Specifically, in this example, we show the first set of services—identified as referring to BBC1—being processed. That is, a first BBC1 service is identified as "BBC1 Wales" and a second BBC1 service is identified as "BBC1 London". The "(GLID)" designation indicates that the associated data came from frequency scanner 104. From a practical standpoint, the reason why there are two different BBC1 services might stem from the fact that there are two transmitter towers that are transmitting BBC1 within reception range of the user.

In this example, notice also that the separated out secondary services have their origin from the file download (e.g. "(File d/1)") from the guide data service 102 in FIG. 1. In this example, these secondary services have scheduling information and may or may not have tuning information. In general practice, it has been found that the tuning data from the frequency scanner is more accurate than the file download data, but the program and scheduling data is less accurate for analog broadcasts. Hence, if frequency scanner data is present, it will typically be used to first identify primary services.

Consider now, at this point in the process, what the inventive methodology has done. Effectively, the methodology has both decoupled the list of possible services from the list of possible signals (as represented by tune requests); it has further decoupled tuning information from scheduling and programming information. Decoupling the list of possible services and the list of possible signals can allow for application of powerful heuristics or algorithms which include things like giving a preference to a particular scanning source over pre-delivered information, giving a preference to a guide data service over pre-delivered data, giving a preference to a particular scanning source over a guide data service, or giving a preference to user-provided data over scanned data. In addition, the heuristics applied in this environment can allow for rule-based signal selection, e.g. if there are two transmission towers, then a selection can be made of the tower that has the best signal for a given user or local device.

Continuing, once the services have been separated into primary and secondary services, step 206 attempts to establish individual primary and secondary service pairings or associations. One way to do this is to attempt to pair or associate primary and secondary services that wish to appear in the same row in the grid that is ultimately displayed for the user. In the illustrated and described embodiment, these associations are built based upon a comparison of certain values that are associated with each of the primary and secondary services. In the present example, this value comprises a preset or channel number associated with each of the primary and secondary services.

Specifically, in the example of FIG. 1, there are two BBC1 primary services (i.e. Wales and London) each of which has an assigned preset of "1". This means that each primary service wants to be located in the first row in the grid that is displayed to the user. In this case, the inventive methodology attempts to make the best association between primary and secondary services. To do this, step 206 attempts to find a secondary service that has a preset that is equal to the preset of the primary service. In this particular example, BBC1 Wales has a preset of "1", as does the secondary service BBC1 North. Accordingly, these primary and secondary services are paired in association with their preset or channel "1".

In this case, the methodology looks for the next secondary service to associate with the primary service—in this case BBC1 London. Notice in this example, that there are two secondary services-one designated BBC1 South with a preset of "12" and one designated BBC1 East with a preset of "13". Accordingly, the methodology associates the next equivalent primary service—in this case BBC1 London—with both of the next two secondary services. Had there been another primary BBC1 service, then BBC1 London would only be paired with one of the corresponding secondary services.

Note that in this example, every secondary service is matched with one primary service. That is, one goal of the methodology is to attempt to associate each secondary service with a corresponding primary service. If the secondary service does not have a corresponding primary service then the secondary service would be orphaned and would therefore not be used in the final construction of the default lineup.

In the event that there is not a match between presets among the primary and secondary services, then step 206 would attempt to locate a secondary service that it could pair with the primary service. For example, assume that there was no secondary service with a preset of "1". In this case, the methodology would look for the next associated secondary service from the corresponding group. This might result in an association between primary service BBC1 Wales and secondary service BBC1 South (with a preset of "12"). This would then leave the primary service of BBC1 London with only an association with secondary service BBC1 East (with a preset of "13").

Once the primary services have been associated with one or more secondary services, step 208 assigns each association a preset or channel number. In an event that there are no conflicts between presets as between the primary services, this process simply maps the primary service's desired preset to an actual preset which will be displayed in the grid. In the example of FIG. 1, assume that the primary service of BBC1 London had a preset of "12". In this case, primary service BBC1 Wales would simply be assigned a preset of "1" and BBC1 London would be assigned a preset of "12". In this example, however, each of the individual primary services has indicated a preset of "1"—and thus has created a conflict.

In the event of a conflict between two sets of primary/secondary service associations, the first primary/secondary service association set is assigned a preset, and subsequent primary/secondary conflicting association sets are set aside until all remaining non-conflicting associations are assigned their particular 11 presets. Thus, in the present example, since primary services BBC1 Wales and BBC1 London conflict by indicating the same preset, the association that includes BBC1 Wales is assigned the preset of "1" and the association of BBC1 London and BBC1 South/BBC1 East is set aside for the time being. Next, the methodology continues preset assignments on all non-conflicting association sets for all remaining service groups as is represented in FIG. 1 step A—that is, those association sets whose primary services do not have the same preset.

Once all of the non-conflicting association sets have been assigned presets, the conflicting association sets are assigned presets starting at the end of the grid. In the example of FIG. 1, this is indicated by an arrow extending from the primary service of BBC1 London to preset "N".

This approach attempts to provide a displayable grid that meets with user expectations. That is, in many markets there is an expectation of which presets or channels map to which primary services for the first N number of services. In the United Kingdom, for example, there is a consumer expectation of mappings for the first five services. In other markets, such expectations could be different. If the set aside operation was not performed in the case of a conflict, this consumer expectation would not be met. Specifically, if the set aside was not performed, then the conflicting primary service might be assigned the next-in-line preset, thus displacing a preset/service association that is expected by the consumer.

In at least some embodiments, a manual step can be performed as part of the processing that takes place at step 208. That is, primary/secondary service association sets can be manually assigned to presets or channels in a manner that is directed to preserving consumer expectations. For example, in some situations data that is received from the data sources (e.g. data sources 102, 104) may not have associated preset information. In this situation, the manual step can attempt to provide association sets and preset assignments that meet with consumer expectations.

At this point in the process, the lineup has been constructed and step 210 can display a grid for the user.

An exemplary grid is shown in FIG. 3. There, grid 300 includes a lineup 302 of the primary services (i.e. TMF, The HITS, UKBright . . . , etc.) and their associated preset or channel assignments (1, 2, 3, respectively), and associated secondary services 304 (if available, note that no secondary service is available for preset 22).

In the illustrated grid, each row is backed by one or more services. In the example of FIG. 1, the grid row that displays channel 1 (i.e. corresponding to BBC1 Wales) is backed by two services. One service is used for tuning information (i.e. the primary service acquired from the frequency scanner) and the other service is used for scheduling information (i.e. the secondary service acquired from the file download). In appearance, however, the grid, such as grid 300, looks to the user like a single unified service. In order to draw the grid, the scheduling information is acquired by the FIG. 1 system from the secondary service. However, when the user clicks on a particular row, the system uses the primary service to acquire the tuning information.

Architecturally, in this example, a channel object such as channel object 150 (FIG. 1) is associated with each row in the grid. The channel object has associated API calls to support the functionality described above. In this specific example, channel object 150 has an API call 152 to retrieve tuning information and an API call 154 to retrieve the scheduling and display information. The API 11 call will use the primary service to retrieve tuning information and the secondary service to retrieve scheduling information. Of course, the number and type of API calls supported by a channel object can change depending on the particular structure of the channel object and the environment in which it is operating.

It is interesting to note, at this point, that the above paradigm enables multiple different disparate sources of data to be processed and presented through a grid to the user in a seamless, coherent and integrated way. To the user, it appears as if one service backups up each of the rows in the grid. Behind the scenes, however, multiple data sources and services have been seamlessly integrated together.

This approach and infrastructure also provides the ability for functionality that was not previously available in the market. For example, in the event that the guide data that is received from the guide data service is inaccurate (e.g. the lineup may be incorrect), the user can, through user interface 106, make changes in the lineup. That is, the user is provided with the ability to change the mapping of preset or channel number to service, or change the primary/secondary service associations. Additionally, in situations where transmission frequencies vary, through the inventive approach, guide data providers are given the ability to override inaccurate tuning information associated with, for example, a primary service. Hence, the information that is then provided to the user is accurate insofar as the tuning information is concerned. In addition, and as noted above, the frequency scanner component 104 (FIG. 1) provides the ability to override the tuning information provided by the guide data service. In this case, the guide data service may not know that the tuning information they provide is inaccurate. Notwithstanding this inaccuracy, the frequency scanner provides the ability to automatically acquire tuning information that is likely more accurate than that provided by the guide data service.

Extending the Decoupling of Preset/Service and Primary/Secondary Services

As noted above, the inventive approach effectively decouples primary and secondary services. In addition, the inventive approach also decouples presets or channels and services. This decoupling permits a wide variety of robust paradigms to enhance not only the user's experience, but also the guide provider's ability to provide accurate guide data. Consider the following examples.

In accordance with the methodology described above, one service can now be associated with multiple tune requests. For example, a data provider may associate multiple tune requests to a given service being broadcast at multiple frequencies. A run-time heuristic may use such an association to determine the best frequency to tune based on their quality or strength.

In addition, one channel/preset can be associated with many different services. For example, a particular row on the grid may be backed by five or more services, all of which may have tuning information and/or scheduling information. When a user selects a particular preset or channel to view, a decision of which service's tune request to use for tuning can be made at that time. The decision might be made, for example, based on signal strength. Hence, a service with the strongest signal may be selected. Alternately or additionally, the decision might be based on the time of day. For example, perhaps during a certain time of day, one service is associated with the tune request and at another time of day, a different service is associated with the tune request.

Additionally, channel 5 may have an NTSC service (i.e. analog service) and an ATSC service (i.e. digital service). In this case, preset 5 could refer to both of these services and each service could have the same schedule. In this case, the methodology could select between the services in view of the digital/analog differences between the two. Such a selection could be based on which tuners are free/busy, and/or the type of transport the user prefers to watch television on based on some predefined user preference. Additionally, selection might be made based upon free-disk space, or perhaps whether the user prefers to time-shift movies in high-definition, and use standard-definition for every thing else.

Additionally, one service might be associated with many different presets. For example, a service may be found on multiple frequencies and users may prefer to see multiple rows in the grid for the same service, rather than a single row in the grid. A heuristic can then determine which service to tune. For example, a viewer may receive Comedy Central on DirectTV and on analog cable. However, the analog cable version may be shared with a shop-at-home channel, so that it's only available in the evenings. That user may wish to have two rows in the grid, one for the full time Comedy Central, and one for the part-time Comedy Central.

Exemplary System

The following discussion is directed to exemplary systems in which the various inventive methodologies described above can be employed. Such systems comprise various audio and/or graphics entertainment and information systems, including television-based systems, such as broadcast TV networks, interactive TV networks, cable networks, and Internet-enabled TV networks, or even Digital radio networks (e.g., DAB). Aspects of the systems and methods described above can be implemented in any number of television-based entertainment and information systems, and within any number and type of client devices. Hence, the following example is not intended to limit application of the claimed subject matter.

FIG. 4 illustrates an exemplary system 400 for viewing and recording TV programs. System 400 includes a client or local device 402, a display 404 (e.g., television, monitor, etc.), and one or more content providers 406. The content providers 406 control distribution of on-demand and/or broadcast media content 408, such as movies, TV programs, commercials, music, and similar audio, video, and/or image content. Content providers 406 are representative of satellite operators, network television operators, cable operators, Web-based content providers, and the like. In addition, one or more guide data services 409 can provide guide data as described above.

The client device 402 receives and stores the media content 408 distributed by the content providers 406, and guide data provided by the guide data services. In particular, the client device 402 is configured to receive and record TV programs broadcast or otherwise transmitted by the content providers 406. Examples of TV programs include news, sitcoms, comedies, TV movies, infomercials, talk shows, sporting events, and so on. The client device 402 can be implemented in many ways, including as a TV-enabled computer, a computer-based media server, a set-top box, a satellite receiver, a TV recorder with a hard disk, a digital video recorder (DVR), a game console, an information appliance, and so forth.

The client device 402 receives the media content 408 via various transmission media 410, such as satellite transmission, radio frequency transmission, cable transmission, and/or via any number of other transmission media, such as a file transfer protocol over a network (e.g., Internet or Intranet) and/or data packet communication. The client device 402 includes one or more media content inputs 412, which may include tuners that can be tuned to various frequencies or channels to receive television signals and/or Internet Protocol (IP) inputs over which streams of media content are received via an IP-based network.

The client device 402 also includes one or more processors 414 which process various instructions to control operation of client device 402, to execute applications stored on the client device, and to communicate with other electronic and computing devices. The processors 414 may further include a content processor to receive, process, and decode media content and program data. The client device 402 is also equipped with an audio/video output 416 that provides audio and video data to the display 404, or to other devices that process and/or display, or otherwise render, the audio and video data. Video and audio signals can be communicated from the client device 402 to the display 404 via an RF (radio frequency) link, S-video link, composite video link, component video link, analog audio connection, or other similar communication links.

The client device 402 is equipped with different types of memory components, including both volatile and non-volatile memory. In this example, the client device 402 has a recording media 420 and a cache 422. The recording media 420 may be implemented in many ways using various non-volatile storage media, such as hard disk drives, redundant disk array systems (e.g. RAID systems), recordable and/or rewritable discs, and so forth. Cache 422 can be implemented, for example, as random access memory (RAM) for faster access during data processing in client device 402. Although not shown, the client device may further include one or more data memory components as well as a program memory to store applications.

One or more application programs can be stored in program memory and executed by the processor(s) 414. Representative applications shown in FIG. 4 is include a lineup construction application 430, a user interface (UI) application 432, an electronic program guide (EPG) application 434, and a DVR and playback application 436. An operating system (not shown) may also be maintained in storage and executed on processor(s) 414.

The lineup construction application can be configured to implement the functionality described above. This application, in conjunction with the UI application 432 and EPG application 434, cooperate to present a viewable grid for the user to make appropriate viewing or consuming decisions.

The DVR and playback application 436 records media content received from the content providers 406 in the recording media 420. The recorded media content 440 includes TV programs that a viewer has recorded to watch at a later time. The DVR and playback application 436 also facilitates playback of the recorded media content 440 on the display 404.

The UI application 432 allows a user to browse and select content recorded on the client device 402. The UI application 432 supports interactive and graphical UI screens that identify the media content 440 stored in the recording media 420 and offers options for handling the media content 440 in some manner. For example, the UI screens might enable navigation to various recorded content (e.g., audio, still images, video, TV programs, etc.), list recently recorded content, or provide detailed information on specific content. In addition, the UI application can enable users to create their own mappings (e.g. mapping presets or channels to various services) as described above.

One exemplary UI screen 442 is depicted on the display 404. This UI screen 442 shows the most recently recorded TV programs.

The EPG application 434 generates a program guide or grid for presentation on the display 404, and the UI application 432 consumes and renders the grid on the display. The program guide includes a schedule indicating when particular content will be broadcast for viewing and on which channel the content will be broadcast. The EPG application 434 enables a viewer to navigate through the program guide and locate broadcast programs, recorded programs, video on-demand programs and movies, interactive game selections, and other media access information or content of interest to the viewer. EPG data 444 is downloaded from the content providers 406 and/or guide data services 409 and stored in recording media 420, where it is accessed by the EPG application 434 to populate the program guide.

The user or viewer is able to navigate the screen 442 or guide using an input device, such as remote control handset 454 or a keyboard and mouse. With the handset 454, the viewer can make appropriate selections for recording or viewing or providing other user input such as, for example, changing preset/service mappings as noted above.

Conclusion

By decoupling the association between services, tuning, program and schedule information, as well as the association between presets/channels and services, a rich and robust set of algorithms can be employed to enhance not only the user's experience, but can facilitate accurate dissemination and use of data associated with consumers' viewing and consuming choices.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
receiving, at a local device, service-related data comprising data of logically equivalent services from multiple different sources, the multiple different sources comprising at least a first source and a second source each providing tuning information and scheduling information of the logically equivalent services, wherein:
the logically equivalent services are services provided by each of the multiple different sources to contain scheduling and tuning information that describes the same service;
the tuning information of the logically equivalent services from the first source is the most accurate among all of the multiple different sources; and
the scheduling information of the logically equivalent services from the second source is the most accurate among all of the multiple different sources;
sorting the service-related data in groups such that data comprising the logically equivalent services from each of the multiple different sources are put together in one of the groups;
decoupling the data in each of the groups into primary services and secondary services of the logically equivalent services, wherein:
the primary services comprise the tuning information provided by each of the multiple different sources; and
the secondary services comprise the scheduling information provided by each of the multiple different sources;
establishing, based on one or more policies, one or more individual associations between the primary services and the secondary services in each of the groups, wherein, for each of the groups having the logically equivalent services, an individual association between a primary service selected from the primary services and a secondary service selected from the secondary services is established such that the primary service contains the most accurate tuning information from the first source and the associated secondary service contains the most accurate scheduling information from the second source;
constructing a lineup by assigning a channel to the individual association of each of the groups; and
displaying on the local device an electronic program guide (EPG) grid embodying the lineup, the EPG grid comprising one or more rows each showing detailed information comprising:
the channel, and
the primary service and the associated secondary service.

2. The method of claim 1, wherein one of the sources comprises at least one guide data service.

3. The method of claim 1, wherein one of the sources comprises at least one frequency scanner.

4. The method of claim 1, wherein one of the sources comprises a user interface.

5. The method of claim 1, wherein one of the sources comprises at least one pre-delivered file.

6. The method of claim 1, wherein one of the sources comprises at least one user-provided file.

7. The method of claim 1, wherein one of the sources comprises at least one user-sharable file.

8. The method of claim 1, wherein the sources comprise at least one guide data service and at least one frequency scanner.

9. The method of claim 1, wherein the sorting comprises sorting the service-related data in accordance with predefined criteria comprising service call signs.

10. The method of claim 1, wherein the establishing associations is based at least on which row in an EPG grid a service indicates that it is to appear in.

11. The method of claim 1, wherein the assigning comprises manually assigning at least one channel.

12. The method of claim 1, wherein the establishing comprises ascertaining whether there are one or more conflicts between the primary services and, if so, attempting to resolve the one or more conflicts.

13. The method of claim 12, wherein the ascertaining comprises ascertaining whether two or more primary services indicate that they are to occupy the same row of an EPG grid.

14. The method of claim 13 further comprising, in an event of a conflict, assigning a channel to a first of the primary/secondary service associations and setting aside at least a second of the associations of a conflicting primary service until additional non-conflicting primary/secondary service associations are assigned to channels.

15. A system comprising:
one or more computer-readable media;
one or more processors;
computer-readable instructions embodied on the one or more computer-readable media which, when executed by the one or more processors, cause the processors to perform a method comprising:
receiving service-related data from multiple different sources comprising at least a guide data service and a frequency scanner, wherein:
the guide data service and the frequency scanner each provides tuning information and scheduling information of logically equivalent services that describe a same broadcast service;
the frequency scanner is configured to determine which tuning frequency provides the best signal quality when receiving the logically equivalent services; and
the scheduling information from the guide data is the most accurate among the multiple different sources;
processing the service-related data to construct a lineup of one or more rows, each of the one or more rows comprising:
the tuning information and scheduling information of the logically equivalent services; and
a channel associated with the tuning information and scheduling information of the logically equivalent services;
wherein the processing comprises:
sorting the service-related data into a group, wherein the data in the group contain the tuning information and scheduling information of the logically equivalent services from each of the guide data service and the frequency scanner;
separating the data in the group into:
primary services comprising tuning information of the logically equivalent services from each of the guide data service and the frequency scanner; and secondary services comprising scheduling information of the logically equivalent services from each of the guide data service and the frequency scanner;

establishing individual primary and secondary service associations based on one or more rules, wherein at least one individual association between a primary service from the primary services and a secondary service from the secondary services is established such that the primary service contains, based on determination of the frequency scanner, the best tuning frequency in terms of the signal quality and the associated secondary service contains the most accurate scheduling information from the guide data; and for at least some established associations, assigning channels; and displaying an EPG grid embodying the lineup.

16. The system of claim 15, wherein the establishing associations is performed based at least on which row in an EPG grid a service indicates that it is to appear in.

17. The system of claim 15, wherein the assigning comprises manually assigning at least one channel.

18. The system of claim 15, wherein the establishing comprises ascertaining whether there are any conflicts between primary services and, if so, resolving the conflicts.

19. The system of claim 18, wherein the ascertaining comprises ascertaining whether two or more primary services indicate that they are to occupy the same row of an EPG grid.

20. The system of claim 19 further comprising, in an event of a conflict, assigning a channel to a first of the associations of a conflicting primary service and setting aside a second of the associations of a conflicting primary service until additional non-conflicting primary service associations are assigned channels.

21. A computer-implemented method comprising:
decoupling tuning information and scheduling information associations of logically equivalent services, wherein:
the one or more of the associations are provided by multiple different sources comprising at least a first source and a second source;
the tuning information from the first source is the most accurate among the multiple different sources;
the scheduling information from the second source is the most accurate among the multiple different sources; and
the logically equivalent services contain metadata that describes a same service; and
allowing one or more heuristics to be applied to the decoupled associations to establish associations between the tuning information and the scheduling information, wherein:
at least an association is established such that the most accurate tuning information from the first source is associated with the most accurate scheduling information from the second source; and
the one or more heuristics comprise:
preference to a particular scanning source over pre-delivered information;
preference to a guide data service over pre-delivered data;
preference to a particular scanning source over a guide data service;
preference to user-provided data over scanned data; and
signal selection based on availability of tuners, preferred types of transport between analog or digital, or availability of local free-disk space.

22. The method of claim 21, wherein the act of allowing comprises allowing heuristics to establish an association between at least one service and multiple tune requests.

23. The method of claim 21, wherein the act of allowing comprises allowing heuristics to establish an association between at least one tune request and multiple services.

24. The method of claim 21, wherein the act of allowing comprises allowing heuristics to establish an association between at least one channel and multiple different services.

25. The method of claim 21, wherein the act of allowing comprises allowing heuristics to establish an association between at least one service and multiple channels.

26. The method of claim 21, wherein the signal selection is further based on one or more of:
one source of tuning information over another source of tuning information, and
one source of scheduling information over another source of scheduling information.

27. The method of claim 26, wherein the tuning information is received from one or more sources comprising a guide data service, a frequency scanner, a user interface, and one or more files.

28. The method of claim 26, wherein the scheduling information is received from one or more sources comprising a guide data service, a frequency scanner, a user interface, and one or more files.

29. One or more computer-readable media having computer-readable instructions thereon which, when executed by one or more processors, cause the processors to implement the method of claim 21.

30. A system comprising:
one or more computer-readable media;
one or more processors;
computer-readable instructions embodied on the computer-readable media which, when executed by the one or more processors, cause the processors to perform a method comprising:
decoupling one or more tuning information and scheduling information associations, wherein:
the one or more of the associations are provided by multiple different sources; and
the one or more associations direct to logically equivalent services that are provided by each of the multiple different sources to refer to a same service;
allowing one or more heuristics to be applied to decoupled associations sufficient to establish associations between the tuning information and the scheduling information such that the tuning information and the associated scheduling information come from different sources of the multiple different sources, wherein:
the one or more heuristics comprise:
preference to a particular scanning source over pre-delivered information;
preference to a guide data service over pre-delivered data;
preference to a particular scanning source over a guide data service
preference to user-provided data over scanned data; and
rule-based signal selection;
ascertaining whether there is any conflict among the associations and, if so, attempting to resolve the conflict; and displaying an electronic program guide grid that embodies the associations.

31. The system of claim 30, wherein the allowing comprises allowing the one or more heuristics to establish an association between at least one service and multiple tune requests.

32. The system of claim 30, wherein the allowing comprises allowing the one or more heuristics to establish an association between at least one tune request and multiple services.

33. The system of claim 30, wherein the allowing comprises allowing the one or more heuristics to establish an association between at least one channel and multiple different services.

34. The system of claim 30, wherein the allowing comprises allowing the one or more heuristics to establish an association between at least one service and multiple channels.

35. The system of claim 30, wherein the rule-based signal selection comprises one or more of:

one source of tuning information over another source of tuning information, or one source of scheduling information over another source of scheduling information.

36. The system of claim 35, wherein the tuning information is received from sources comprising one or more of: at least one guide data service, a frequency scanner, a user interface, and one or more files.

37. The system of claim 35, wherein the scheduling information is received from sources comprising one or more of: at least one guide data service, a frequency scanner, a user interface, and one or more files.

* * * * *